United States Patent
Hansen et al.

(10) Patent No.: US 8,200,558 B2
(45) Date of Patent: *Jun. 12, 2012

(54) SYSTEM FOR PROVIDING STEP OUT COMMISSIONS AND COMPENSATION FOR RESEARCH BROKERS

(75) Inventors: Peter Hansen, Stamford, CT (US); Nicolay Landmark, Hall Green (GB); Lars Kragh, Stamford, CT (US)

(73) Assignee: Convergex Execution Solutions LLC, New York, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/716,894

(22) Filed: Mar. 3, 2010

(65) Prior Publication Data

US 2010/0161390 A1 Jun. 24, 2010

Related U.S. Application Data

(63) Continuation of application No. 10/779,486, filed on Feb. 13, 2004, now Pat. No. 7,693,763.

(51) Int. Cl.
*G06Q 40/00* (2006.01)
(52) U.S. Cl. ........................................ 705/35
(58) Field of Classification Search ............... 705/35
See application file for complete search history.

(56) References Cited

U.S. PATENT DOCUMENTS

| 2002/0128958 | A1 | 9/2002 | Slone |
| 2002/0198815 | A1* | 12/2002 | Greifeld et al. ............... 705/37 |
| 2003/0225662 | A1 | 12/2003 | Horan et al. |
| 2003/0225666 | A1 | 12/2003 | Murtaugh et al. |
| 2004/0236660 | A1* | 11/2004 | Thomas et al. ............... 705/37 |
| 2004/0254877 | A1 | 12/2004 | Buckwalter et al. |
| 2005/0021437 | A1 | 1/2005 | Bock |

OTHER PUBLICATIONS

BrokerShare, www,instinet.com, web.archive.org Oct. 8, 2003.*
BrokerShare, www.instinet.com/brokerage_services/brokershare.shtml, Oct. 8, 2003, retrieved from www.archive.com.
Arvedlund, Erin E., "Hard on Soft Dollars? Wall Street Firms spooked ahead of Securities and Exchange Commission Report," Barron's, Jun. 9, 2003, vol. 83. Iss. 23, p. F2.

* cited by examiner

*Primary Examiner* — Charles Kyle
*Assistant Examiner* — Clifford Madamba
(74) *Attorney, Agent, or Firm* — Byrne Poh LLP

(57) ABSTRACT

In a trading environment that comprises buy side traders and securities brokers, a computer process capable of preventing securities brokers from receiving information irrelevant to a commission payment for a securities transaction. The process comprises means for providing an overview of commission payments for a predetermined time period, means for providing details of step-out payments for the predetermined period, means for adjusting step-in amounts and frequencies, means for providing notification that a commission payment has been stepped out and is capable of being credited, means for automatically suggesting and performing step-ins and step-outs, and means for assessing the step-outs and step-ins against a predetermined budget.

13 Claims, 7 Drawing Sheets

Fig. 4

| EQ | Broker | Symbol | Ord Qty | Step Qty | Rate |
|---|---|---|---|---|---|
| ○ | FIFI | AA | 302433 | | $0.03 |
| ○ | BERN | CAT | 80000 | | $0.05 |
| ○ | FIFI | C | 500000 | | $0.03 |
| ○ | MONT | MSFT | 74000 | | $0.06 |
| ○ | FBCO | PFE | 65000 | | $0.03 |
| ○ | MLCO | WMT | 36000 | | $0.03 |
| ○ | FIFI | PCG | 1200000 | | $0.03 |
| ○ | FIFI | SAP | 300000 | | $0.05 |
| ○ | SBSH | LYG | 21000 | | $0.05 |
| ▲ | UBSW | CAT | 97000 | | $0.03 |
| ○ | MONT | GE | 64000 | | $0.06 |
| ○ | FBCO | LYG | 59000 | | $0.06 |
| ○ | BERN | XOM | 70000 | | $0.05 |
| ○ | MONT | GE | 74000 | | $0.06 |
| ○ | FBCO | BP | 89000 | | $0.06 |
| ○ | WACH | JNJ | 89000 | | $0.04 |

Recapture

| | From | To | Symbol | Stepout Qty | Stepout $ |
|---|---|---|---|---|---|
| | FIFI | FBCO | AA | 63000 | $1,890.00 |
| ▲ | UBSW | MONT | CAT | 4100 | $123.00 |

Step out

Print Report

Overview | Stepout | AutoStepout

Exec Quality | Millennium | Payments | Budget | Brokers

SYSTEM FOR PROVIDING STEP OUT COMMISSIONS AND COMPENSATION FOR RESEARCH BROKERS

CROSS REFERENCE TO RELATED APPLICATIONS

This application is a continuation application of U.S. patent application Ser. No. 10/779,486, filed on Feb. 13, 2004, the contents of which are incorporated by reference herein.

FIELD

The present invention relates to electronic trading networks utilized for security trading and more specifically to a system and method which allows for payment to the research brokers for his services without providing trading information.

BACKGROUND

Markets have existed for centuries which allow people to buy and sell securities (e.g., stocks, futures, options, commodities, etc.) from one another. Today, examples of these markets in the United States are: The New York Stock Exchange (NYSE), The National Association of Security Dealers Automated Quotation (NASDAQ) System, and The American Stock Exchange (AMEX). These modern security markets facilitate the exchange of over two billion shares of stock every business day.

In making its buying decision and executing upon those, a large investor, such as an insurance company, typically has relationships with 40 to 80 brokerage firms. Some of these brokers have excellent research services while others have excellent execution service. Thus the large investor will use some to provide it research to determine stocks to be traded (the research broker) and others to perform the trades (the executing broker) Both brokers need to be paid for the system to work and it would be more profitable to a broker if it preformed both services.

Investors, for historical reasons, have paid their brokers only through trading commission. Thus only the trading broker received payment. To compensate the research broker, the buy side broker "steps out" part of its trade to the research broker. This step-out process is undertaken through the clearing process where some of the shares executed in a trade are allocated to the research broker.

As an illustration, executions are currently sent back electronically to the buy-side trader from the executing venue, as illustrated in FIG. 1.

This process creates a problem for the buy-side trader. The step-out process reveals the buy side trader's exact trading information to the research broker. The research broker can use or "leak" this information to the market, causing the buy-side trader to receive less favorable prices. This information leakage also gives the research broker inside knowledge about the buy-side trading strategy, enabling the research broker or other unintended parties to benefit from the order flow at the expense of the buy-side trader.

Accordingly what is needed is a method for automatically providing to the research broker a commission in a manner that eliminates information leakage from the buy-side to the research broker.

SUMMARY

In a trading environment that comprises buy side traders and securities brokers, a computer process capable of preventing securities brokers from receiving information irrelevant to a commission payment related to a securities transaction. The process comprises means for providing an overview of commission payments for a predetermined time period, means for providing details of step-out payments for the predetermined period, means for adjusting step-in amounts and frequencies, means for providing notification that a commission payment has been made and is capable of being credited, means for automatically suggesting and performing step-ins and step-outs, and means for assessing the step-outs and step-ins against a predetermined budget.

In a first embodiment, the overview means comprises means for storing all commission payments to a plurality of registered brokers, means for storing the commission for a particular order, and means for storing individual step-outs for a particular executing broker as associated with a particular order.

In the first embodiment, the means for storing a plurality of commission payments to a plurality of registered brokers comprises a means for storing the brokerage firms registered with the system, means for storing the total amount of commission earned by a broker from executing orders within a defined time period, means for storing the total amount that has been stepped in to each research broker using the anonymous commission service for the trading period, means for storing the amount stepped in to the research broker and stepped out from the executing broker, respectively, during the predefined time period; and means for storing the net commission payable to the brokers.

In the first embodiment, the means for storing the commission for a particular order comprises means for identifying the stock chosen by the trader for a particular order, means for indicating the number of shares which have been executed during the life of the order, means for indicating the quantity of shares that are scheduled to be "stepped out" from a particular order, and means for indicating the commission rate per share of stock.

In the first embodiment, the means for storing individual step-outs for a particular executing broker as associated with a particular order comprises means for identifying a particular executing broker selected for a step-out, means for identifying the number of shares being stepped out, and means for indicating the amount of commission taken from the executing broker through the step-out.

In a second embodiment, the means for providing details of step-out payments for the predetermined period comprises means for storing payments stepped out, both anonymously and through traditional methods, from particular orders, and means for listing a plurality of step-outs, from a plurality of orders.

In the second embodiment, the means for storing payments stepped out, both anonymously and through traditional methods, from particular orders comprises means for indicating the execution quality of the broker, the system has means for listing the executing broker, for the order, from which payments are stepped out, means for listing the stock for the order, means for storing the number of shares executed for the order, means for storing the quantity of shares being stepped out from the order, and means for storing the rate per share of commission for the step-out.

In the second embodiment, the means for listing a plurality of step-outs, from a plurality of orders, comprises means for listing the executing broker, means for listing the research broker, means for storing the stock ticker, means for storing the quantity to be stepped out from the executing broker, and means for storing the dollar amount stepped out.

In a third embodiment, the means for adjusting step-in amounts and frequencies comprises means for listing registered brokers, means for indicating the default commission rate for a selected broker, means for programming commission recapture, means for allowing step-outs against an executing broker to be limited on both along and short term basis, means for choosing a payment method for paying a research broker, means for programming predefined intervals for paying research brokers, and means for identifying the client for whom the trader is employed.

In the third embodiment, the means for programming predefined intervals for paying research brokers is capable of being programmed to pay the research brokers immediately upon a clearing of a trade, or at a predefined time or financial interval.

In the third embodiment, the means for choosing a payment method for paying a research broker is capable of being programmed to execute a payment though commissions, traditional step-ins, anonymous step-ins, or hard-dollar payments.

In the third embodiment, the means for programming commission recapture is capable of being programmed for no recapture, for recapture as a ratio of commission, and for recapture from a fixed base of commission.

In a fourth embodiment, the means for providing notification that a commission payment has been stepped out and is capable of being credited comprises means for programming the desired notification frequency, and means for providing notification to the research broker.

In the fourth embodiment, the means for programming the desired notification frequency is capable of being programmed to provide notification when payments are made, when commissions have accrued, at a predetermined time or financial interval, or when the commission account accrues multiples of a chosen dollar amount.

In a fifth embodiment the means for automatically suggesting and performing step-ins and step-outs comprises means for listing orders, means for storing the preferences which govern the automatic step out, means for listing automatically suggested step-ins, and means for storing the preferences which govern the automatic step-in(s).

In the fifth embodiment, the means for listing orders comprises means for indicating the executing broker from which shares are to be stepped out, means for storing the stock ticker, means for storing the quantity of stock ordered, means for listing the step-out quantity, and means for storing the rate of the commission on the shares of the order.

In the fifth embodiment, the means for indicating the preferences which govern the automatic step out comprises a plurality of adjustable controls, said adjustable controls capable of adjusting the degree to which a larger or smaller number of stepouts are suggested, the degree to which stepout quantity is made larger or smaller, the degree to which relatively larger or smaller orders should be chosen for step-outs, the degree to which orders in favored stocks should be chosen for step-outs, and the degree to which blocked stocks should be avoided for step-outs. Said means further comprises means for adding favored or blocked stocks.

In the fifth embodiment, the means for listing orders comprises fields, the fields being automatically populated according to adjustment of the means for indicating the preferences which govern the automatic step out.

In the fifth embodiment, the means for listing an automatic step-in comprise means for indicating the research broker for which share quantities will be stepped in, and means for identifying whether the broker is stepped in through anonymous or traditional methods.

In the fifth embodiment, the means for indicating the preferences which govern the automatic step-in comprise a plurality of control variables, the control variables capable of controlling each of the adherence to client directions to direct a portion of the client's order flow to particular executing venues (typically in the context of participation in a commission recapture scheme), paying firms that are furthest behind with payments relative to the budget; prioritizing paying firms that provide soft-dollar services, and the degree to which the user prefers spreading the payments over a large amount of brokers.

In the fifth embodiment, the means for listing an automatic step-in comprises fields, the fields being automatically populated according to adjustment of the means for indicating the preferences which govern the automatic step in.

In a sixth embodiment, the means for assessing the step-outs and step-ins against a predetermined budget comprise means for listing actual budget values, and means for indicating the budgeted commission amount for a predetermined period and the dispersion of the commission for a predetermined period.

In the sixth embodiment, the means for listing actual budget values comprises means for listing the rank of an executing broker, means for listing the identity of the executing broker, means for listing the target percentage of the entire commissions which the broker is to be paid over a predetermined period, means for listing the target dollar amount which the broker is to be paid over the time period, and means for listing the updated amount of commission paid to the broker during the predefined time period.

In the sixth embodiment, the means for indicating the budgeted commission amount and the dispersion of the commission for a predetermined period comprises means for depicting the total budgeted commission, means for depicting how the amount of commission is distributed among executing brokers, research brokers, soft dollars, and discretionary distributions.

A method is disclosed for preventing brokers from receiving information irrelevant to payment from a securities transaction that comprises tracking payments to research brokers, stepping-out commission payments for the research brokers without interacting with executing brokers, and paying the research brokers.

BRIEF DESCRIPTION OF THE FIGURES

In order to describe the manner in which the above recited objectives are realized, a particular description of the invention will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

FIG. 4 is a screen through which the system displays payments stepped out from particular executing brokers;

DESCRIPTION OF THE EMBODIMENTS

A system is disclosed that segregates the payment of research brokers from executing brokers thereby preventing research brokers from receiving information related to the execution of the trade.

Figure 2:
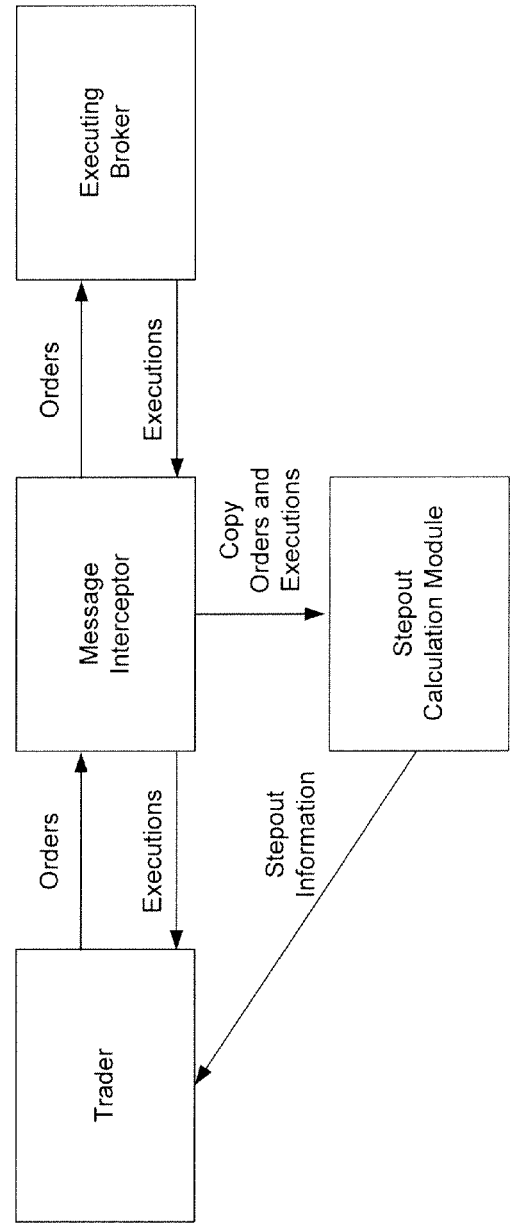
FIG. 2 is a diagram showing the flow between a buy-side trader and an executing broker according to the invention.

Turning to FIG. 2, the present invention introduces a system comprising one or more integrated computer programs that implement a system to intercept the electronic data connection between the executing broker and the trader's order management system. The system non-intrusively intercepts records pertaining to orders and executions without interfering with the communications between the trader and the executing venue. The system processes the information through a Stepout Calculation Module (SCM) Through the SCM, the system calculates the stepout information in real time (or near real time). The system displays the results to the trader.

In use, the computer system presents a trader with input fields for identifying the research broker entitled to commission 101 (FIG. 3) and identifying the amount stepped out to the research broker 103. Other presented fields govern the frequency for paying the research brokers based upon, for example, an accumulated payout 319 (FIG. 5), or a time based frequency 317. The research broker is capable of being notified that a payment is stepped-out by the system 405 (FIG. 6).

Figure 3:
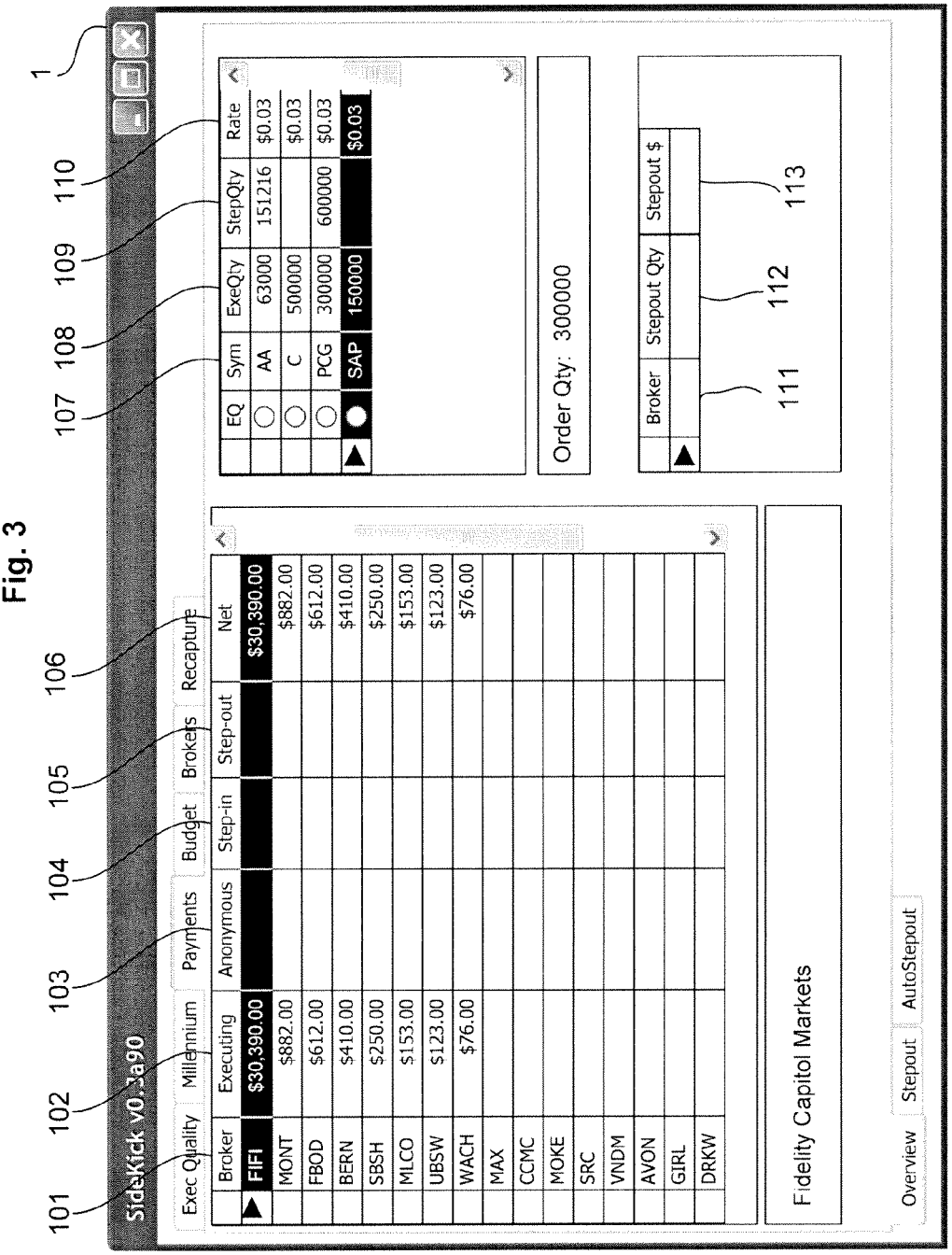
FIG. 3 is a screen through which the system displays an overview relating to the real time step-out amounts as related to daily orders.

Turning to FIG. 3, the system provides means for providing an overview of commission payments for a predetermined time period. The means comprises a screen 1 provided to the trader, where the commission payments represent a single trading day. It should be appreciated that the time period represented on the screen can be any defined time, including multiple days, weeks, months, etc. The longer the time period, the greater the overview of how much commission has been paid to a particular broker.

On the left side of the screen, the system provides a means for displaying all commission payments to every registered broker; the means being defined by a series of columns for displaying such information as the identity of brokers; the commission to each broker, and other information which will become clear.

The system includes a means for displaying the brokerage firms registered with the system. The means consists of a display of such firms at column 101. The brokerage firms are listed by common acronyms, such as USBW for USB Warburg and BERN for Bernstein. Each brokerage firm may be capable of supplying execution services, research services, or both.

Figure 1:
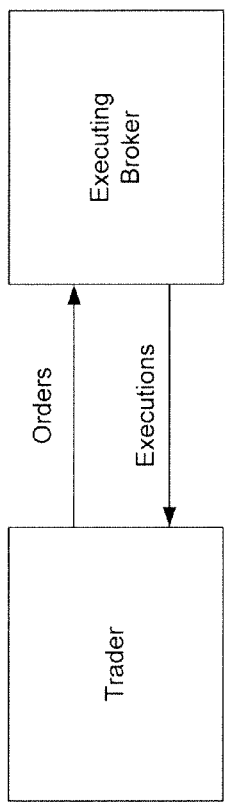
FIG. 1 is a diagram showing the flow between a buy-side trader and an executing broker in the prior art.

The overview screen 1 has a means for displaying the total amount of commission earned by a broker from executing orders within a defined time period. The means consists of displaying such information at column 102. It can be appreciated that the brokerage firm with the greater number of executions differs from the brokerage firm that performs the research. In FIG. 1, FIFI (Fidelity Capital Markets) has earned far more executing commission than USB Warburg indicating that FIFI is unlikely to be a research broker and is unlikely to receive a step-in.

The system includes a means for displaying the total amount that has been stepped in to each research broker using either traditional or anonymous commission service for the trading period. The means consists of a display for the trader at column 103.

In use, the system is a proxy to the research broker and collects commissions that are funded from the Anonymous entries. The system provides the research broker with commission payments and without any other sensitive and confidential trade information. The research broker is unable to deduce trading habits of the buy-side trader or execution practices of the executing broker. Accordingly, the research broker is unable to utilize sensitive trade related information to the detriment of the executing broker or the buy-side trader.

The system includes means for displaying the amount stepped in to the research broker and stepped out from the executing broker, respectively, during the predefined time period. The means consists of columns 104 and 105, respectively.

The overview screen 1 provides the trader with means for displaying the net commission 106 payable to the brokers, defined as the sum of the columns Executing+Anonymous+Step-in, minus the Step-out amount. The net commission column 106 is an indication of which brokerage house receives the most money over a given period. The trader is capable of using this information to diversify the research and executing broker load.

Referencing the upper right corner of the overview screen 1, the system provides means for displaying the commission for a particular order. The means includes a series of columns that identifies relevant stocks, the number of traded shares, and other information which will become self evident.

The system provides a means for identifying the stock chosen by the trader for a particular order. The means consists of a column 107 for displaying the information. For example the trader chooses Pacific Gas and Electric, which is listed on the NASD as PCG. The stock column 107 is capable of listing each order that the trader has open.

Adjacent to the stock column 107 is a means for indicating the number of shares which have been executed during the life of the order. The means consists of a column 108 for displaying the stated information. For example, the system indicates that three hundred thousand shares of PCG stock have been traded. The step quantity is identified through a means for indicating the quantity of shares that are scheduled to be "stepped out" from a particular order. The means is represented by a column 109 for displaying the information. For example, the trader has decided to step out six hundred thousand shares from the PCG order. The executed quantity is capable of being lower than the step-out quantity prior to the completion of the order.

The system has a means for indicating the commission rate per share of stock. The means is represented by information in column 110. The commission rate for a trade is predetermined by the trader so that information provided in the column 110 is typically only for reference; but it can be manually overridden if necessary.

The stepped-out dollar amount for an order is capable of being calculated by the system in a two step fashion. The first step is multiplying the figures in the step quantity column 109 and the figures in the rate column 110. These multiples are placed in a new column which signifies the dollar amount stepped-out for a given stock in one order. The second step is summing the amounts placed in the new column.

Referring to the bottom-right corner of the overview screen 1, the system provides means for displaying individual step-outs for a particular executing broker as associated with a particular order. The means includes a table that identifies the relevant execution broker and information that will be self evident with the disclosure, below.

The system has means for identifying a particular executing broker selected for a step-out. The means is disclosed by information in Column 111. Adjacent to the executing broker, the system has a means for identifying the number of shares being stepped out. The means is represented by the information in column 112. The system also has a means for indicating the amount of commission taken from the broker from the step-out. The means is illustrated by information in column 113.

In use, the overview screen 1 is continuously updated on a real time basis. The trader reviews the overview screen 1 to determine the amount of step-out anonymously (or traditionally) paid to one or more research brokerages as a result of an executed order. The system provides the trader with real-time verification of the stocks associated with an order and the total shares and commission rate that are payable due to the order. The overview screen 1 also provides the trader with the exact commission stepped-out from a particular executing broker for a given quantity of shares.

Turning to FIG. 4, the system provides means for providing details of stepout payments during the predetermined period. The means is defined by a screen, where the left side of the screen has a means for displaying payments stepped out, both anonymously and through traditional methods, from particular orders. The means, on the left side of the screen, is defined by a table listing such information as relevant brokers, the stepout to the brokers, and other information that will now become self evident.

The system has means for indicating the execution quality of the broker. The means is represented by a button column 201. The execution quality is displayed in various colors indicating the performance record or level of the broker. For example, "Red" indicates a below-average execution quality, "Grey" indicates a broker that is on par, and "Green" indicates a broker that has performed above average. It should be appreciated that the execution quality could be represented by other means, such as a number, or a graph, or any other reasonable display.

The colors are activated and de-activated automatically in real time, in response to the execution quality changing in real time.

Adjacent to the first column 201, the system has means for listing the executing broker for the order, from which payments are stepped out. The means is displayed in column 202. Adjacent to the broker column 202 is a means for listing the stock for the order, a means for displaying the number of shares executed for the order, and a means for displaying the quantity of shares being stepped out from the order, and a means for displaying the rate per share of commission for the step-out. These means are displayed in columns 203, 204, 205 and 206, respectively. The exact dollar amount stepped out from the executing broker is the quantity of stock stepped from the trade times the rate per share.

In use, the step-out quantity is agreed between the executing broker and the trader. The screen is updated when the trader performs a step-out, initiated by pressing the Step-Out button 212. The order quantity 204, unlike the execution quantity 108, represents the amount of shares for the entire order and is never less than the step quantity 205. The research broker is listed on this screen whether paid traditionally or anonymously.

The step out screen 2 has a right hand side having means for listing all step-outs, from all orders. The means consists of a table listing relevant information, described below.

The system has a means for listing the executing broker. This information lists the broker being stepped out-from in column 207. The system also has a means for listing the research broker. This means lists the broker being stepped in-to at column 208. The step-in listings represent both anonymous and traditional methods. The purpose of listing both types of trades is to illustrate the relationship between the executing broker and the research broker. This area provides the trader with autonomy to interact with research brokers using either anonymous or traditional step-ins.

The system displays the specifics of the step-out. The specifics are illustrated through means for displaying the stock ticker, a means for displaying the quantity to be stepped out from the executing broker, and a means for displaying the dollar amount stepped out. These display means are represented in columns 209, 210 and 211. Furthermore, the information in column 211 represents the information in column 210 times the commission rate.

Figure 5:
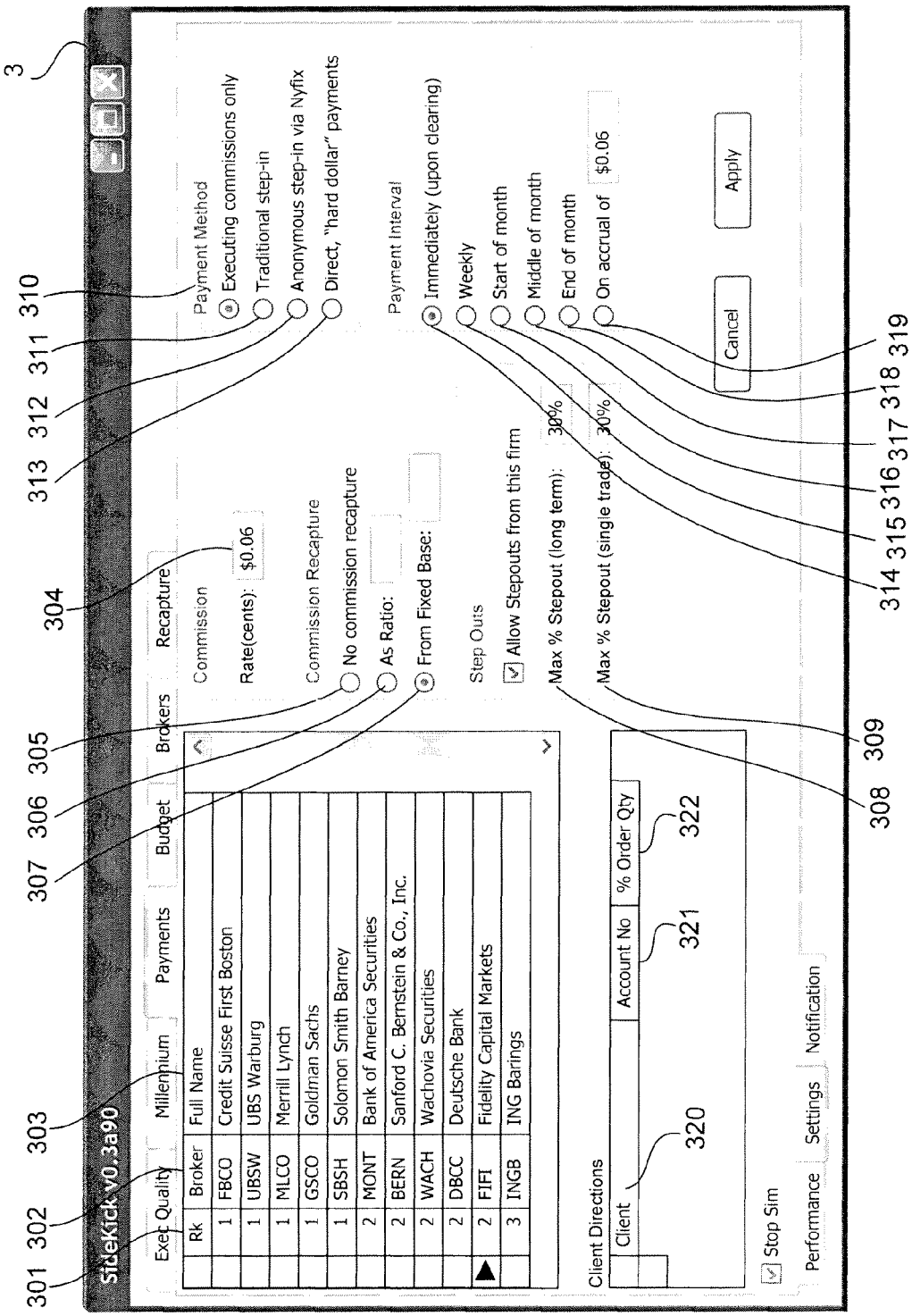
FIG. 5 is a screen through which the system receives information related to the frequency of stepping out commissions.
Figure 6:
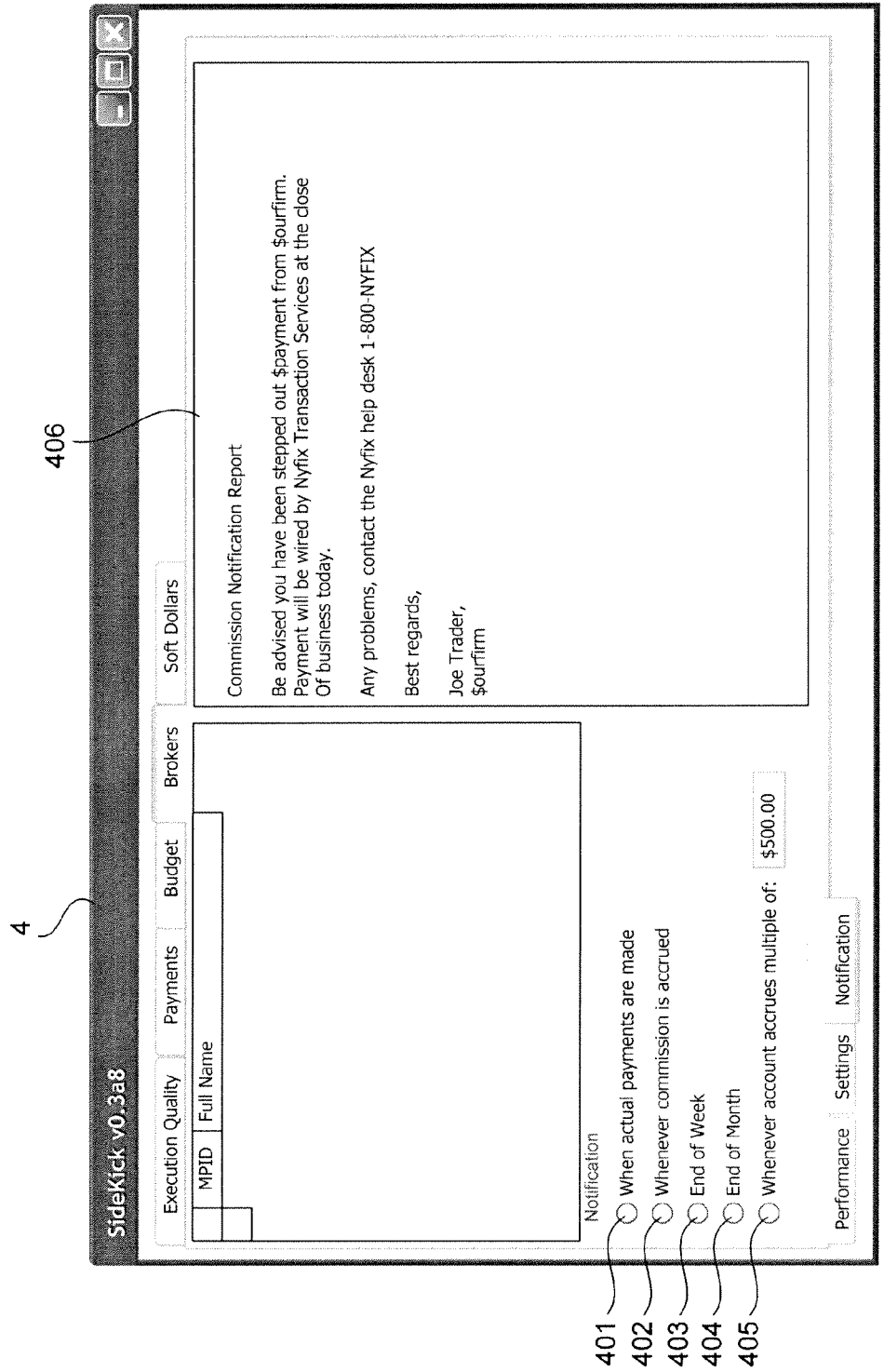
FIG. 6 is a screen through which the system receives information related to the frequency of notifying a research broker of available commissions.

Turning to FIG. 5, the system provides means for adjusting step-in amounts and frequencies. The system provides the buy-side trader with a screen 3 that enables the trader to specify the desired amount and frequency for performing the step-in for the research broker. Referring to the upper-left corner of the chart 3, the system provides means for listing registered brokers. The means is defined by a column 301 that indicates the rank of each such broker. The rank of a brokerage firm indicates which commission tier the broker is in; e.g. the top 5 commission recipients are all considered to be tier/rank 1. The rank indicates the relative budgeted turn-over for each broker. Adjacent to the rank of the broker are columns 302 and 303 for the research broker by symbol and name, respectively. This area of the chart 3 enables the trader to quickly choose and adjust or program the payment schedule for a particular research or executing broker.

Referring to the center of the chart 3, the system provides means for indicating the default commission rate for a selected broker. The means is defined by information in field 304. The commission rate is usually agreed upon prior to any orders being placed; the trader may on occasion choose to alter the commission rate for a particular order. The system also has means for programming commission recapture. The means is defined by a group of fields that allow the trader to deactivate the commission recapture, setting a ratio for recapture and setting a fixed recapture amount at buttons 305, 306 and 307, respectively.

The system has means for allowing step-outs against an executing broker to be limited on both a long and short term basis. This means is illustrated by input fields 308 and 309. The purpose of limiting the step-outs is to assist the trader in diversifying the step-out load. For example, the trader may wish to diversify the load between two or more firms, each receiving fifteen percent on a single trade 309.

Referring to the upper-right corner of the chart 3, the system has means for choosing a payment method for paying a research broker. The means is listed via table 310. Table 310 includes an option exists at 310 for paying a broker solely through commission that the firm earns from executing trades. This option is appropriate if the broker is an executing broker and is unutilized for research purposes. Another option for payment is traditional step-in at button 311. This option is unutilized when there is an interest in preventing the research broker from obtaining information related to the trade. When the trading information is sensitive, the anonymous payment method is selected at 312. Furthermore, direct dollar payments 313 are chosen when the broker is only paid directly by the buy-side trader on separate and agreed upon circumstances.

Referring to the bottom right corner of the chart 3, the system has means for programming predefined intervals for paying research brokers. The means is illustrated by a chart that is utilized when an anonymous payment method is selected at button 312. If a non-anonymous payment is scheduled, via buttons 310, 311 or 313, the system is unutilized so that no payment schedules are needed for a research broker. The interval payments are predefined at immediately, weekly, start of a month, middle of a month, end of a month, and upon the accrual of a particular amount of stepped-out commission, at buttons 314-319, respectively. It should be appreciated that other periods are definable.

On the lower left corner of the chart 3 the system provides means for identifying the client for whom the trader is employed. The means is provided by columns 320 and 321 and are utilized to facilitate client directed order flow. Clients may direct the trader to diversify trade orders between a plurality of brokers Column 322 identifies the percent of the order flow that should be directed to the given broker (as selected in the table above column 302).

Turning now to FIG. 6, the system provides means for notifying the research broker that a commission payment has been stepped out and is capable of being credited. The notification screen 4, in the lower, right corner, provides means for programming the desired notification frequency. This means is provided by selectable buttons for the trader.

The system is capable of notifying the research broker at the following predefined intervals: when actual payments are made 401; when commissions have accrued 402; at the end of each week 403; at the end of each month 404; or when the commission account has accrued multiples of a chosen dollar amount 405. The predefined intervals are similar to the intervals for paying the research broker at buttons 314-319. It should be appreciated that the notification interval could be different without affecting the essence of the invention.

Referring to the right side of the notification screen 4, the system has means for providing notification to the research broker. The means is disclosed as screen 406. The notice is capable of being a standard notice advising the research broker to engage the system or a known third party for retrieving the commission payment.

In use, the system enables the trader to anonymously pay the research broker at predefined intervals, via buttons 312 and 314-319. The system enables the notification of the broker at corresponding or other chosen intervals at buttons 401-404. The research broker is capable of retrieving the commission payment without having to interact with the executing broker or the buy-side trader.

Figure 7:
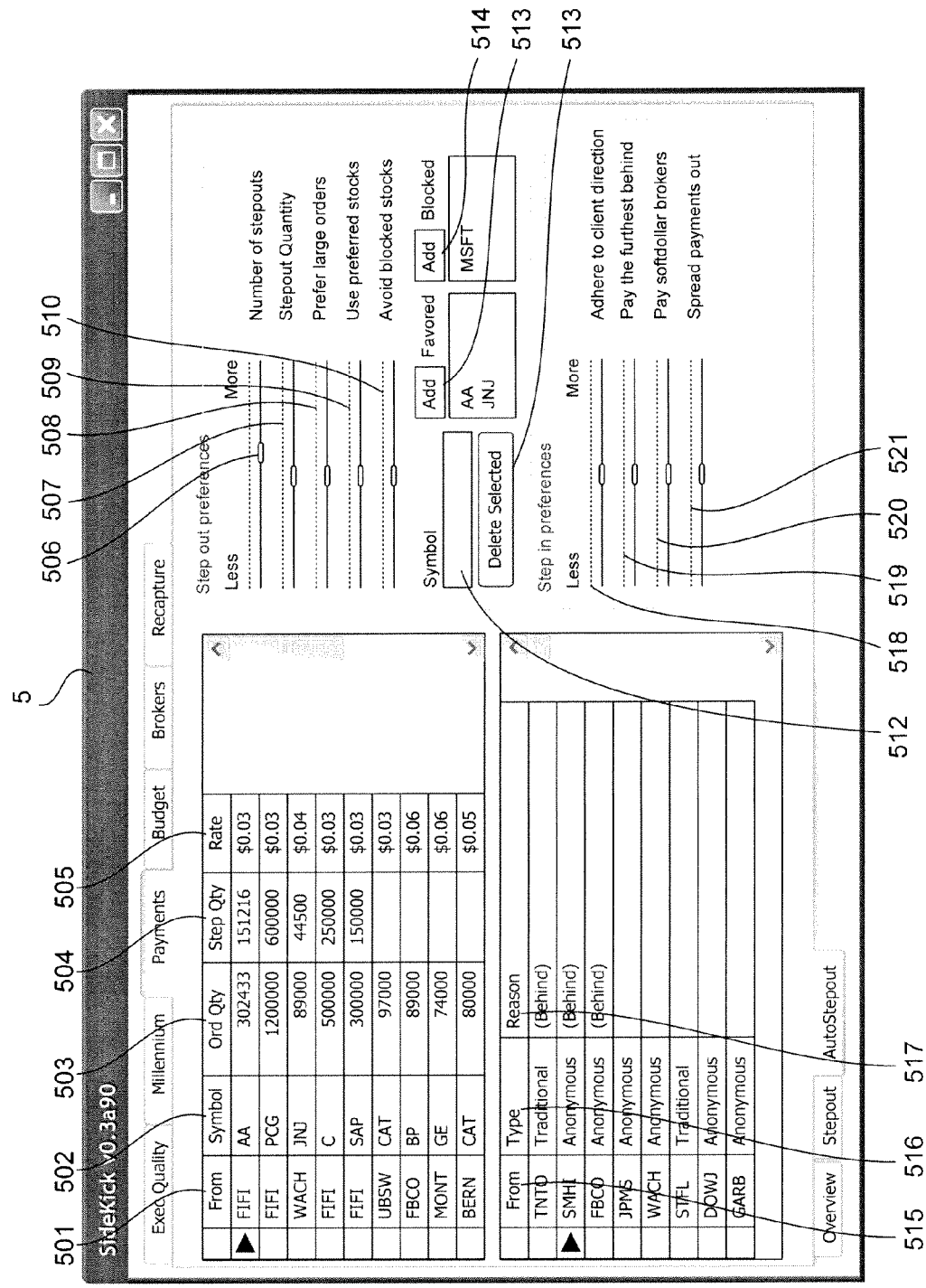
FIG. 7 is a screen through which the system is capable of automatically performing step outs.

Turning to FIG. 7, the system provides means for automatically suggesting and performing step-ins and step-outs. The means are represented with the relevant information displayed in screen 5. The upper left area of the screen 5 has a means for listing orders. The means includes information such as the relevant brokers, the related stock, and other information which will become self evident.

The system has means for indicating the executing broker from which shares are to be stepped out and means for displaying the stock ticker. The means are represented in columns 501 and 502, respectively, where the stock ticker 502 lists the shares selected for that order. The system also has means for indicating the quantity of stock ordered, a means for listing the step-out quantity, and a means for illustrating the rate of the commission on the shares of the order. These means are respectively listed in columns 503, 504 and 505.

These columns have information which provides identical meaning to the columns with the similar labels in the manual step out screen 2. However, the fields in this screen 2 are automatically populated by the system according to step-out preferences indicated by the trader.

Referring to the upper right corner of the automatic step out screen 7, the system provides means for indicating the preferences which govern the automatic step out. The means are provided by various controls that are capable of being adjusted include the degree to which a larger or smaller number of stepouts are suggested 506, the degree to which stepout quantity is made larger or smaller 507, the degree o which relatively larger or smaller orders should be chosen for step-outs 508, the degree to which orders in favored stocks should be chosen for step-outs 509, and the degree to which blocked stocks should be avoided for step-outs 510.

The preference factors are capable of being applied against a predefined budget and against the order quantity 503 and the rate 505. The result of these calculations provides the orders listed in the window in columns 501-505. The list is populated by, from top to bottom, the order that most clearly meets the selected preferences.

The screen 5 provides the trader with means for adding favored or blocked stock symbols. This means is implemented in fields 511-514. Specifically, the system allows the trader to add a favored stock to the list by inserting the symbol of the stock in field 512 and selecting "add." A stock symbol would be added as a favored stock for step-out purposes if the stock was, for example, easy to execute.

On the other hand, the trader could choose to block a stock symbol from automatic step-outs by inserting the symbol in field 511 and selecting "add" in field 514. An stock would be blocked if the stock was, for example, difficult to trade due to lack of liquidity etc. The system is not likely to suggest an order with a "blocked" stock for step-out purposes if the user designates "more" on the "avoid blocked stocks" control 510. However, if the user selects "less" on the "avoid blocked stocks" control, then blocking an order for this reason would have less significance. An order for a stock in the "blocked" stock list might wind up on the automatic step-out list if other factors are relatively more important, depending on the setting of the controls.

Referring to the lower left corner of the automatic step-out screen 5, the system provides the trader with means for listing an automatic step-in. The means is defined by a screen having fields, where the information in the fields will be self evident by the following disclosure.

The system has means for indicating the research broker for which share quantities will be stepped in, and a means for identifying whether the broker is stepped in through anonymous or traditional methods. These means are illustrated in column 515 and 516, respectively. This method is selected in columns 311-313 in screen 3, FIG. 5. The system provides means for illustrating the reason(s) that the system has chosen to place a specific broker. This means is illustrated by information in column 515.

Referring to the lower right corner of the screen, the system provides means for indicating the preferences which govern the automatic step-in. The means are provided by user-controlled elements, including control 518 titled "adhere to client directions." The control is capable of being varied between "less" and "more." If this control 518 is set to "more," step-in candidates listed in the column 515 will be firms that receive client-directed order flow, for example as a consequence of the client participating in a commission recapture scheme. Conversely, if set exclusively to "less," client direction will not be important when deciding how to populate the list 515.

The system provides the user with a control titled "pay the furthest behind" 519. If this control is set to "more" the system will populate the list 515 with firms that are behind with being paid, i.e. people that are owed money compared to what the amount budgeted. Conversely, if the user sets the control to "less," the fact that someone is behind will not be important when deciding what firms to populate the list 515.

The system also provides the user with a control titled "pay soft dollar brokers" 520. If this control is set to "more" then step-in candidates populated by the system into column 515 will favor firms that provide soft-dollar services. Conversely, if the control is set to "less" then soft dollar service provision will not be important when deciding how to populate the list 515. Below the soft dollar control 520, is a control titled "spread payments out" 521. If this control is set to "more" then the available money for the day will be spread out thinly to as many step-in candidates as possible, populating the list 515 with more firms. Conversely, if the control 521 is set to "less," then relatively few firms will be populated by the system into column 515, and each firm will be paid a larger sum.

The suggested step-outs and step-ins are capable of being controlled by the trader. The system therefore is capable of automating the process of paying the required commissions while providing the trader with the ultimate control.

Figure 8:
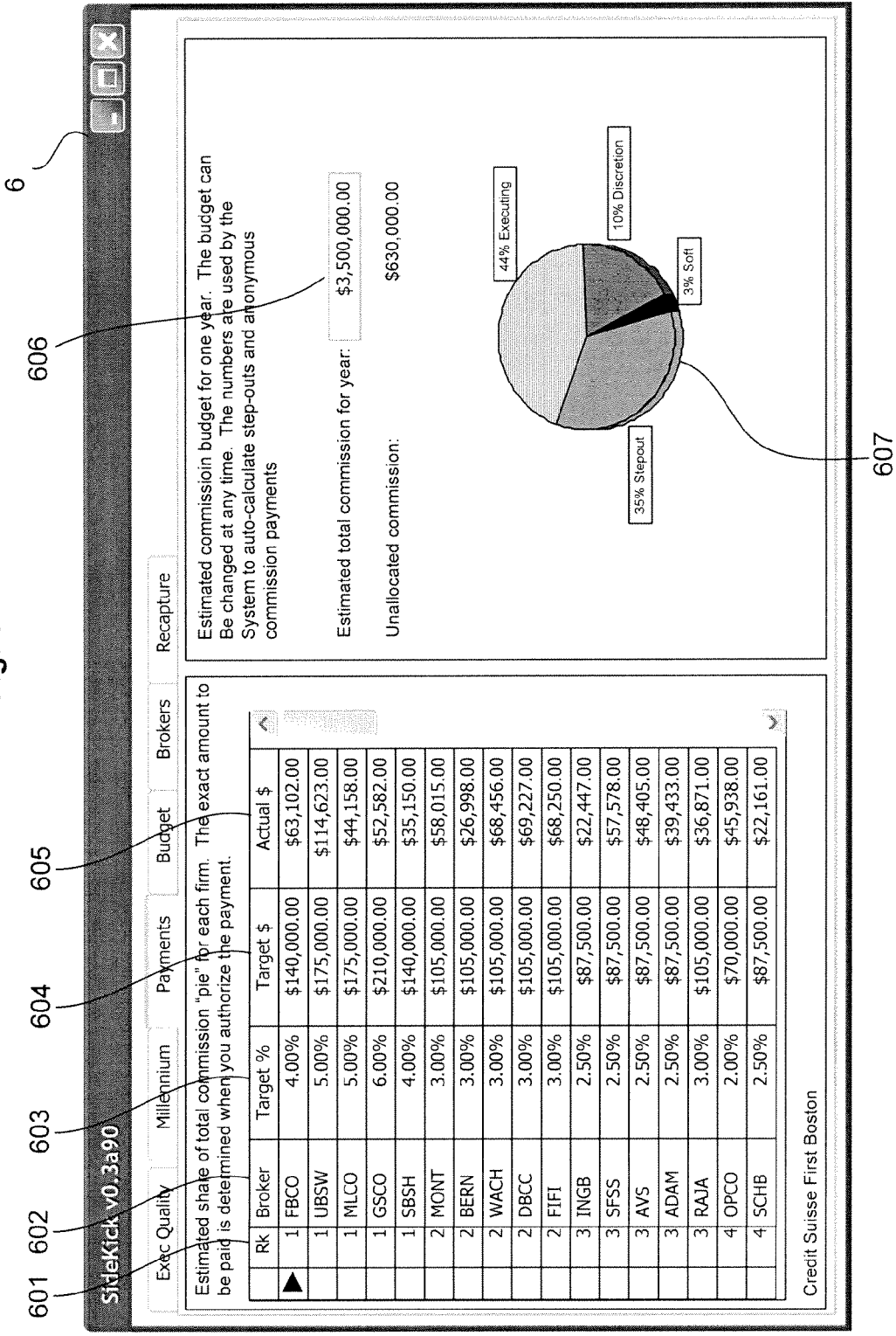

Turning now to FIG. 8, the system provides means for assessing the step-outs and step-ins against a predetermined budget. The means is provided through a screen 6 that illustrates a budget. The budget provides values which the system is capable of applying towards calculating the automatic step out.

The budget screen 8 has a left side which depicts a means for listing actual budget values. The means includes lists of brokers, targeted goals for the brokers, and other relevant information which will now become self evident. The system has means for listing the rank of an executing broker and means for listing the identity of the executing broker. These means are provided in columns 601 and 602, respectively.

The system illustrates a means for listing the target percentage of the entire commissions which the broker is to be paid over a predetermined period. This means is depicted in column 603 lists, and the predetermined period is, for example a quarter or a year. The system has a means for listing the target dollar amount which the broker is to be paid over the time period and means for listing the updated amount of commission paid to the broker during the predefined time period. These means are disclosed in columns 604 and 605, respectively.

To the right of the budget on screen 6 is means for indicating the budgeted commission amount and the dispersion of the commission for a predetermined period. The means are depicted by a fields and a chart that will become self evident with the following disclosure. The predetermined period is, for example, a complete year.

The system has means for inputting the total commission budget for the year. The means includes a field at 606. The total budget is the accumulated commission to each broker, both research and executing. The system has means for depicting how the amount of commission is distributed among executing brokers, research brokers, soft dollars, and discretionary distributions (not yet allocated to any of the preceding). As illustrated, the means is depicted in a pie chart 607.

Accordingly, a system has been disclosed that segregates the payment of research brokers from executing brokers thereby preventing research brokers from receiving information related to the execution of the trade.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed:

1. A system for performing step-out payments comprising: at least one computer programmed to (1) intercept digital data related to trade execution transmitted between a trader system and an executing broker system; (2) segregate one or more step-out payments due to a research broker from one or more payments provided to an executing broker, (3) make said one or more step-out payments automatically to said research broker without providing information related to trade execution to said research broker, and (4) notify said research broker that said one or more step-out payments are made.

2. The system, in accordance with claim 1, wherein said step-out payments are selected from one or more of the group consisting of: commissions, traditional step-ins, anonymous step-ins and hard-dollar payment.

3. The system, in accordance with claim 1, wherein said at least one computer receives:
a specification of favored or blocked stocks; and
a designation of weighting, less or more, to be applied to said specification.

4. The system, in accordance with claim 1, wherein said at least one computer receives:
an identification of said research broker for which share quantities will be stepped in; and
an instruction whether said payment will be anonymous or traditional.

5. The system, in accordance with claim 1, wherein said at least one computer receives:
an instruction to adhere to client directions; and
a designation of weighting, less or more, to be applied to said instruction.

6. The system, in accordance with claim 1, wherein said at least one computer receives:
an instruction to pay first a research broker that is furthest behind; and
a designation of weighting, less or more, to be applied to said instruction.

7. The system, in accordance with claim 1, wherein said at least one computer receives:
an instruction to pay a research broker with soft dollars first; and
a designation of weighting, less or more, to be applied to said instruction.

8. The system, in accordance with claim 1, wherein said at least one computer receives:
an instruction to spread payments out amongst as many research brokers as possible; and
a designation of weighting, less or more, to be applied to said instruction.

9. The system, in accordance with claim 1, wherein said at least one computer is further programmed to generate a performance report assessing said step-out payments against a predetermined budget.

10. The system, in accordance with claim 1, wherein said at least one computer is further programmed to generate a performance report which lists a target percentage of commissions which said research broker is to be paid over a predetermined period.

11. The system, in accordance with claim 1, wherein said at least one computer is further programmed to generate a performance report depicting a budgeted commission amount and an actual commission paid over a predetermined period.

12. The system, in accordance with claim 1, wherein said at least one computer is further programmed to generate a performance report depicting how a commission is distributed among executing brokers, research brokers, soft dollars and discretionary distributions.

13. A system for performing securities step-out arrangements comprising:
- at least one computer operatively configured and programmed to:
  - intercept electronic trading data over a set period of time transmitted between a trader and a broker;
  - determine:
    - a) one or more commission payments due on electronic trading between said trader and said broker over said set period of time,
    - b) number of step-out payments due on said one or more commission payments,
    - c) details of each step-out payment due on said one or more commission payments, and
    - d) one or more commission payments due to an executing broker less one or more of said step-out payments due to one or more research brokers;
  - present said one or more commission payments to a trader as a suggestion;
  - automatically perform one or more suggested or revised payments;
  - notify said executing broker that said one or more commission payments over said set period of time payable to said executing broker are available; and
  - notify said one or more research brokers that one or more of said step-out payments over said set period of time are available, without disclosing to said one or more research brokers said commission payment made available to said executing broker.

* * * * *